(12) United States Patent
Clark

(10) Patent No.: US 10,949,154 B2
(45) Date of Patent: *Mar. 16, 2021

(54) SYSTEMS AND METHODS FOR USING SCREEN SAMPLING TO DETECT DISPLAY CHANGES

(71) Applicant: VMware, Inc., Palo Alto, CA (US)

(72) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 889 days.

This patent is subject to a terminal disclaimer.

(21) Appl. No.: 15/404,311

(22) Filed: Jan. 12, 2017

(65) Prior Publication Data

US 2017/0123746 A1 May 4, 2017

Related U.S. Application Data

(63) Continuation of application No. 13/904,981, filed on May 29, 2013, now Pat. No. 9,547,466.

(51) Int. Cl.
| G09G 5/393 | (2006.01) |
| G06F 3/14 | (2006.01) |
| G09G 5/36 | (2006.01) |
| G06F 9/451 | (2018.01) |

(52) U.S. Cl.
CPC ............ *G06F 3/1415* (2013.01); *G06F 9/452* (2018.02); *G09G 5/363* (2013.01); *G09G 5/393* (2013.01); *G09G 2354/00* (2013.01)

(58) Field of Classification Search
CPC .......................... G06F 3/0488; G06F 12/0269
See application file for complete search history.

(56) References Cited

U.S. PATENT DOCUMENTS

| 6,275,500 | B1 * | 8/2001 | Callaway, Jr. | ........ H04W 74/06 370/346 |
| 2002/0000990 | A1 * | 1/2002 | Schauser | ............... G06F 3/1462 345/504 |
| 2002/0056017 | A1 | 5/2002 | Morgan | |
| 2003/0149723 | A1 * | 8/2003 | Zhao | ........................ G06F 9/54 709/203 |
| 2003/0220823 | A1 * | 11/2003 | Sartorius | ................ G06Q 10/10 709/223 |
| 2009/0079876 | A1 * | 3/2009 | Takeshima | ............ G06T 3/4069 348/699 |
| 2009/0100350 | A1 * | 4/2009 | Fuse | ........................ H04N 7/15 715/753 |
| 2009/0300543 | A1 * | 12/2009 | Mower | ................... G06F 9/451 715/809 |
| 2009/0325142 | A1 * | 12/2009 | Beavers | .................... G09B 5/14 434/365 |

(Continued)

*Primary Examiner* — Rayeez R Chowdhury

(57) ABSTRACT

A graphical user interface (GUI) is polled to identify updates for transmission to a client device. A generalized poll of the GUI is conducted at a first frequency, wherein the poll compares color values of each pixel in a general region of the GUI with a previously known color value for that pixel to detect changed pixel color values. A local region that is a subset of the general region is determined to have a greater likelihood of being updated, e.g., regions encompassing a location of mouse and/or keyboard activity. A localized poll is conducted at a second frequency of only the local region of the GUI.

17 Claims, 2 Drawing Sheets

(56) References Cited

U.S. PATENT DOCUMENTS

| | | | | |
|---|---|---|---|---|
| 2010/0161711 | A1* | 6/2010 | Makhija | H04L 69/02 709/203 |
| 2011/0285730 | A1* | 11/2011 | Lai | G09G 3/2092 345/536 |
| 2012/0262379 | A1* | 10/2012 | King | G06F 3/1454 345/173 |
| 2013/0151883 | A1* | 6/2013 | Winbom | H04L 12/6418 713/500 |
| 2013/0265335 | A1* | 10/2013 | Peacock | G06F 3/1462 345/684 |

* cited by examiner

US 10,949,154 B2

SYSTEMS AND METHODS FOR USING SCREEN SAMPLING TO DETECT DISPLAY CHANGES

CLAIM OF PRIORITY

This Application is a Continuation Application of, and claims the benefit of, U.S. patent application Ser. No. 13/904,981 entitled "SYSTEMS AND METHODS FOR USING SCREEN SAMPLING TO DETECT DISPLAY CHANGES", by Jonathan Clark, which was filed May 29, 2013, and issued as U.S. Pat. No. 9,547,466, the disclosure of which is incorporated by reference herein in its entirety.

BACKGROUND

Display remoting involves accessing the graphical user interface generated by a first computing system at a second computing system remote from the first computing system. Display remoting is used in many contexts, including, for example, server-based computing models. Virtual desktop infrastructures (VDI) are one example of server-based computing, in which complete centrally-managed desktops are provided to users using computer virtualization technology. VDI may be used to create a large number of independent computing environments for a large number of users. In a typical VDI architecture, user displays and input devices are local to the user, but applications execute remotely in a server. As such, a virtual desktop may be accessible by one or more remote users through a network. The virtual desktop may mimic a desktop computer interface or an interface of another computer or system by providing a virtual screen or virtual display to an end user. Display remoting is used in many other contexts, however, including desktop sharing, network conferencing, and remote access to home or work computing systems, etc.

Display remoting requires identifying which portion of the virtual display have changed in a low-latency manner. Various methods have been used to identify display changes when the remote display server is integrated in the graphics display stack. To detect display changes, the contents of the frame buffer may need to be repeatedly read and compared with a previous frame buffer data. For an optimal user experience, it is desirable to reduce the latency between when a change occurs and when it is detected. However, polling the full screen at a high frequency consumes large amounts of a central processing unit (CPU) resources. Because of the amount of CPU resources required to read and differentiate a full frame, the minimum average latency that can be achieved also decreases as the monitored resolution increases.

To address this challenge, U.S. patent application Ser. Nos. 12/428,949, filed Apr. 23, 2009 and entitled "Method and System For Identifying Drawing Primitives for Selective Transmission to A Remote Display" and U.S. patent application Ser. No. 12/428,971, filed Apr. 23, 2009 and entitled, "Method And System for Copying a Framebuffer For Transmission to a Remote Display," both of which are incorporated herein by reference, describe an efficient method of detecting display updates (differences between previous and current frames) and transmitting the updates to a remote system.

SUMMARY

Systems and methods described herein facilitate using screen sampling to detect display changes. A graphical user interface (GUI) is polled to identify updates for transmission to a client device. A generalized poll of the GUI is conducted at a first frequency, wherein the poll compares color values of each pixel in a general region of the GUI with a previously known color value for that pixel to detect changed pixel color values. A local region that is a subset of the general region is determined to have a greater likelihood of being updated, e.g., regions encompassing a location of mouse and/or keyboard activity. A localized poll is conducted at a second frequency of only the local region of the GUI.

DETAILED DESCRIPTION

Figure 1:
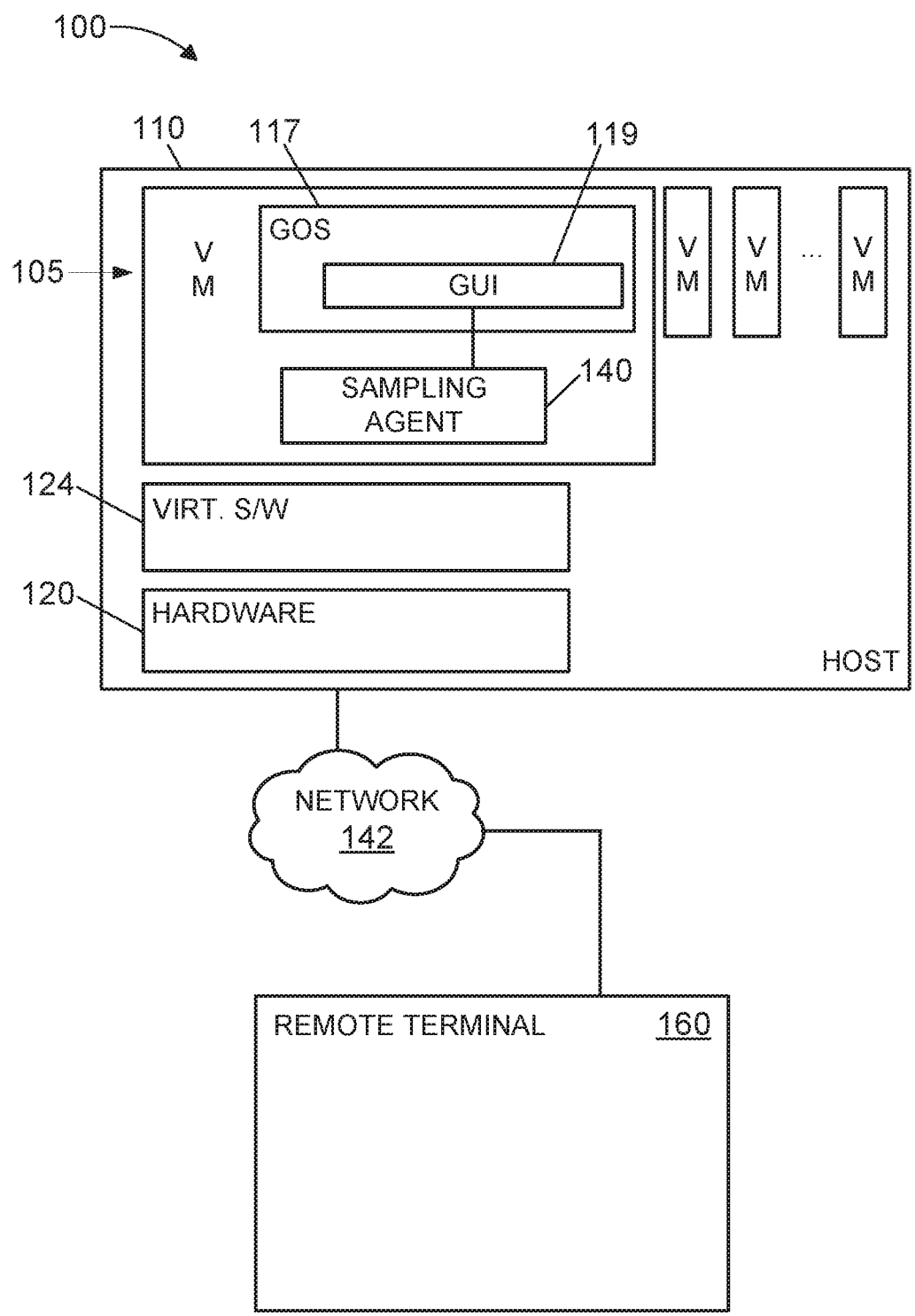
FIG. 1 is a block diagram of an exemplary system having one or more desktops that provide a display.

FIG. 1 is an exemplary an exemplary system, wherein the system is a virtual desktop infrastructure (VDI) 100 having a plurality of virtual machines (VMs) 105 on a physical computer system or host 110. While a VDI is shown as the exemplary system, the present disclosure is not limited to a VDI. For example, the system may be a physical desktop computing system that is being remotely accessed by its user. In the exemplary embodiment, host 110 includes hardware 120, virtualization software or manager 124 running on hardware 120, and one or more VMs 105 executing on hardware 120 by way of virtualization software 124. The virtualization software 124 is therefore logically interposed between, and interfaces with, hardware 120 and VMs 105. Virtualization software 124 may be partially implemented directly in the hardware, e.g., as a system-on-a-chip, firmware, FPGA, etc. Hardware 120 includes at least one processor (not shown), wherein each processor is an execution unit, or "core," on a microprocessor chip. Hardware 120 also includes a memory system (not shown), which may include general volatile random access memory (RAM) and non-volatile memory, as well as a network interface device (NIC) (not shown), and other devices (not shown).

Virtualization software 124 is sometimes referred to as a hypervisor, and includes software components for managing hardware resources and software components for virtualizing or emulating physical devices to provide virtual devices, such as virtual disks, virtual processors, virtual network interfaces, etc. (none shown) for each VM 105. Each VM 105 is an abstraction of a physical computer system and may include a guest operating system (GOS) 117, such as Microsoft Windows®, and guest application software (not shown). The term "guest" indicates it is a software entity that resides within the VM.

In the exemplary embodiment, an end user of VMs 105 connects to, and interacts with, the VM 105 using a remote terminal 160 that is capable of communicating with host 110 via a network 142, which may be the Internet, a LAN, a WAN, or any combination thereof. Remote terminal 160 may be a desktop computer, laptop, mobile device, thin client, or other similar device. Remote terminal 160 is capable of displaying graphical user interface (GUI) 119 generated by the guest operating system (GOS) 117 running inside VM 105 to the end user using a computer display or similar device (not shown) at remote terminal 160. Remote terminal 160 is also capable of receiving user input from the end user using various input devices such as a mouse and keyboard (not shown), which are located at remote terminal 160 and transmitting the received user input to the GOS running inside VM 105.

Each VM 105 may be referred to as a virtual desktop as it provides an interactive user environment provided by the GOS and applications running within VM 105, and generates GUI 119, but may include other outputs, such as audio, indicator lamps, tactile feedback, etc. GOS 117 also accepts input from the user in the form of device inputs, such as keyboard and mouse inputs that are injected into VM 105 by virtualization software 124 in a manner well known in the art of computer virtualization. In addition to user input/output, GOS 117 may send and receive device data, such as input/output for a FLASH memory device or a local printer (not shown) connected to remote terminal 160.

VM 105, in one embodiment, includes sampling agent 140 that is in communication GUI 119. As explained in more detail below, sampling agent 140, using APIs provided by GOS 117, for example, is configured to read one or more display buffers (each corresponding to a display) (not shown) populated with graphical data that represents the GUI generated by the VM. For example, in the exemplary embodiment, sampling agent 140 is configured to conduct a general poll of each display buffer at a first frequency to identify changes to the GUI. The general poll may be, for example, a full-screen poll or a poll of a subset of the full-screen. By "poll," it is meant that at least a region of the display area (which may be the entire display area) is compared with corresponding region of a previous version (or "frame") of the display buffer to identify differences which represent updates to the GUI. U.S. Patent Application Publication 2010/0271379, published Oct. 28, 2010, describes one method of polling a frame buffer containing GUI graphical data, and is incorporated herein by reference. In addition, sampling agent 140 is configured to identify a portion of virtual display 119 that, according to heuristics, are more likely to have display changes than other portions, and sampling agent 140 is configured to conduct a localized poll at a second frequency that is limited to the identified portion to detect display changes, wherein the second frequency greater than the first frequency. The terms, "portions" and "portion" are used interchangeably herein to denote either a single contiguous region or multiple disjoint regions of the graphical user interface.

During operation, as explained in more detail below with respect to FIG. 2, VMs 105 each provide a GUI 119 that is transmitted or otherwise made available to a sampling agent 140 for that VM. While in one embodiment, each VM has an agent residing within the VM, it is also possible for the sampling agent to reside outside the context of the VM 105. If the sampling agent is outside the context of the VM, then a virtual graphics interface device for the VM, which is an emulated graphics interface that runs within a virtual machine monitor (VMM) component (not shown) of virtualization software 124 can be used to access a frame buffer for GUI 119.

Sampling agent 140 may initially conduct a general poll of GUI 119 at a first frequency to identify display changes that occurred since a previous general poll. For example, in one embodiment, sampling agent 140 may conduct a series of full-screen general polls every two seconds. The general poll at the first frequency may be conducted by sampling agent 140 when VM 105 is idle, i.e., when there is no user input over a specified period of time, for example.

When one or more user input events occur and VM 105 is no longer idle, sampling agent 140 may conduct a localized poll at a higher frequency. More specifically, sampling agent 140 first identifies a portion of GUI 119 where display changes are likely to occur. In one embodiment, sampling agent 140 may identify a portion of GUI 119 that is associated with a location of a user input event, corresponding to an activity such as a mouse move, mouse click or a keyboard input on GUI 119, as user input events are likely to cause a localized display change. For example, when a user presses a key on a keyboard (not shown), an application is likely to render a new change to the display at a location of a text caret. Similarly, when a user moves a mouse (not shown) or clicks the mouse, there is a higher probability of a display change. Sampling agent 140 may also identify regions of GUI 119 that are associated with a location of a mouse cursor and/or a text caret on GUI 119, as such locations that are likely to be associated with a display update. For example, when the mouse moves over a display button, the display button may glow or some animation may be triggered. In another example, when the user types a text character, the location of the text caret may help identify where the text character may be rendered on the display.

Upon identifying the portion of GUI 119 where display changes are likely to occur, sampling agent 140 may then generate a sampling map that identifies pixels of GUI 119 belonging to the identified portion. The sampling map may be implemented as a bitmap that is the same size as the GUI 119, wherein each 1-bit pixel indicates whether a pixel is included in the identified portion. In another embodiment, the bitmap is smaller than the GUI such that each bit represents a block, or tile, of pixels. The sampling map may also be implemented using one or more vectors or bounding boxes (not shown) that encompass the pixels belonging to the identified portion. Sampling agent 140 may then poll the portion within the sampling map at a second frequency, which is higher than the first frequency. Sampling agent 140 may then compare the first poll with the second poll to detect display changes. Alternatively, the sampling agent 140 may not generate a sampling map and may, instead, conduct a poll of each of the identified regions at the second frequency separately to identify any display changes for a predetermined period of time. Sampling agent 140 may then compare each region during the first poll with the same regions during the second poll in order to detect display changes.

In some embodiments, sampling agent 140 may also identify, for localized polling at the second frequency, regions of GUI 119 that may have display changes based on the historical changes that occurred within the regions. For example, when a video is playing, constant updates to a particular region may indicate that that region is likely to change again. The historical changes of GUI 119 may also be maintained using sampling maps. For example, after sampling agent 140 has identified regions of possible display changes and generated a sampling map that includes the identified regions, sampling agent 140 may store the sampling map for a period of time such that the stored sampling map may be used to identify future regions of likely display changes. Sampling agent 140 may then generate a sampling map that combines all the identified regions of historical changes saved in previously-generated sampling maps and all the identified regions that have display changes since the preceding localized or general poll. Sampling agent 140 may then poll the combined regions within the sampling map at the second frequency. Alternatively, sampling agent 140 may poll the identified regions of historical changes at the second frequency separately for a predetermined period of time.

In another embodiment, the general poll may exclude regions of the screen determined to be idle, and poll the idle regions at a lower frequency than the frequency of the general poll. For example, if a user has two applications open with separate user interface windows, and is actively working on only one of the applications, the region of the GUI occupied by the application the user is not actively working on may be deemed "idle" and polled at a lower frequency, e.g., once every 10 seconds, than the general region. The frequencies of polling of the general, local, and idle regions may be pre-configured or made adjustable by the user. Adjustments may be made automatically or manually based on available processor and network bandwidth, which are determinable using known techniques. Finally, any two of the general, local, and idle region polls may be set at a common frequency such that for example only the polling frequency of the idle region is different.

Sampling agent 140 transmits the detected display changes to remote terminal 160. Since polling at the second or higher frequency is limited to the identified regions and/or identified regions within a sampling map, the load on the host 110 is significantly reduced. More specifically, CPU consumption is reduced and lower average latency on detection of changes can be achieved. In addition, because sampling agent 140 is transmitting the detected display changes, the full screen display images may not need to be transmitted to the remote terminal 160. Accordingly, the data transmission may be substantially reduced.

Figure 2:
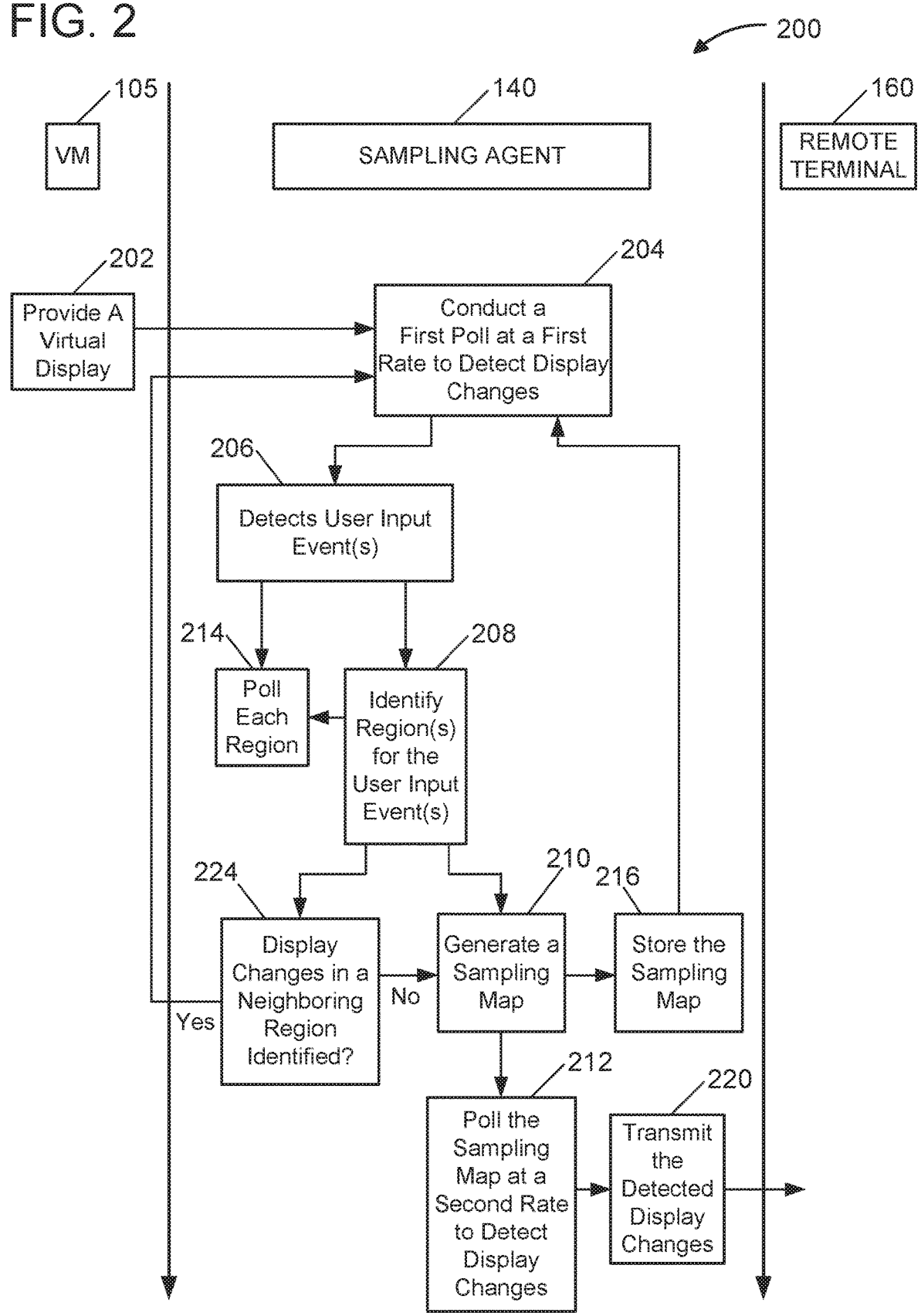
FIG. 2 is a swimlane diagram of an exemplary method for using screen sampling to identify changes of the display.

FIG. 2 is a swimlane diagram 200 of an exemplary method for using screen sampling to identify changes of a GUI, such as the GUI 119 (shown in FIG. 1). This method is embodied within a plurality of computer-executable instructions stored in one or more memories, such as one or more computer-readable storage mediums. The instructions are executed by one or more processors to perform the functions described herein.

In operation 202, a VM, such as VM 105, provides a GUI, such as GUI 119, that is transmitted or otherwise made available to a sampling agent, such as sampling agent 140. In operation 204, the sampling agent 140 conducts a first poll of GUI 119 at a first frequency to identify one or more display changes for a predetermined period of time. In the exemplary embodiment, the first poll may be a general poll, such as a full-screen poll. Moreover, when sampling agent 140 is conducting the general poll at the first frequency, sampling agent 140 may conduct a series of full-screen polls to detect display changes every two seconds by comparing a current frame with a previous frame. For example, sampling agent 140 may conduct a first full-screen poll at a first predetermined time, such as at 0 seconds. Sampling agent 140 may then conduct a second full-screen poll at a second predetermined time, such as at 2 seconds. For each successive full-screen polling event after the first full-screen poll, sampling agent 140 may compare the contents of the full frame buffer with prior frame buffer data to detect any display changes since the prior full-frame poll.

Sampling agent 140 then identifies the regions where display changes are likely to occur and the sampling agent 140 may temporarily increase the polling for the identified regions. Initially, in operation 206, sampling agent 140 detects one or more user input events, as they will likely cause display changes. The one or more user input events may include a mouse click and/or a keyboard input, or a mouse cursor and/or a text caret that exists on GUI 119. Sampling agent 140 then identifies the regions on GUI 119 where the user input events occur in operation 208. For example, a user may hover the mouse over a display button, which causes the display button to glow. Sampling agent 140 determines the location of where the mouse cursor is on GUI 119 and may draw, for example, a box around the area to identify the region of the display 119 where the event is occurring. Similarly, sampling agent 140 may identify various other regions within GUI 119. In one embodiment, the presence and location of recent mouse and/or keyboard activity may be determined by subscribing to user interface events using APIs provided by guest operating system 117 (FIG. 1).

Sampling agent 140 generates a sampling map that combines the identified region(s) in operation 210. The identified regions include regions identified by detecting display changes using the first poll in operation 204 and regions identified in operation 208. Including the regions identified during the first or full-screen poll to the sampling map may enable a detection of, for example, a movie playing that can be added to the sampling map. In operation 210, sampling agent 140 may also combine one or more stored sampling maps with the identified regions to generate a sampling map that includes current display changes (i.e., from user events and cursors, changes identified at the first polling frequency, etc.) and historical display changes.

In operation 212, sampling agent 140 may perform localized polls wherein only the combined regions identified by the sampling map as being more likely to contain updates, are checked for changes. The localized polls may be performed more often than general polls, e.g., twice every second as opposed to every two seconds. If both a generalized poll and a localized poll are both scheduled to perform at a particular time, then they may be combined into a single generalized poll. Thus, in one embodiment, every two seconds, one generalized poll and three localized polls are performed. In one embodiment (not shown) the sampling map identifying localized polling regions may be updated with each (generalized or localized) poll rather than with only each generalized poll. For example, operations 208 and 210 may be performed prior to each generalized poll at operation 214 as well as prior to each localized poll at operation 212.

In the exemplary embodiment, after sampling agent 140 has identified regions of possible and/or actual display changes and generated a sampling map that includes the identified regions, sampling agent 140 may store the sampling map for a predetermined period of time in operation 216 such that the stored sampling map may be used to identify future regions of likely display changes. A history of display changes is created as one or more sampling maps are stored. As previously-generated sampling maps are only saved for a predetermined period of time, the history of display changes extends for the predetermined period of time. A sampling map stored in operation 216 may be used in future executions of operation 210, as described herein. In operation 220, sampling agent 140 transmits the detected display changes to remote terminal 160.

When polling occurs on only part of a screen or when polling occurs at a higher frequency on only a part of a screen, then only part of a screen change may be captured, which may result in "tearing." Tearing refers to an visible artifact of updating only a portion of a change so that a moved object on the GUI is broken into updated and non-updated parts, which visually appears as though the graphics object is torn into multiple parts. One example may occur when a window is dragged across the display but only the top part of the window is redrawn in its new location. As such, sampling agent 140 may be configured to detect tearing. For example, the identified regions are defined by a border and sampling agent 140 may identify whether a display change occurs across the border to a neighboring region of the identified regions in operation 224. For example, a user input may cause a display change in a neighboring region instead of, or in addition to, in an identified region. If display changes are detected in neighboring regions, a full-screen poll is immediately conducted by sampling agent 140 to detect display changes that may be outside the identified regions, as shown in operation 224. If no display changes are detected in neighboring regions, then the method proceeds and sampling agent generates a sampling map of the identified regions, as shown in operation 210.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method, comprising:
    generating, by a server device, a graphical user interface (GUI) for remoting to a client device over a network connection;
    polling, at the server device, a first portion of the GUI at a first frequency to detect one or more display updates to the GUI that are to be transmitted to the client device; and
    polling, at the server device, a second portion of the GUI at a second frequency to detect the one or more display updates to the GUI that are to be transmitted to the client device, wherein the second frequency is different from the first frequency;
    wherein polling the first portion of the GUI and polling the second portion of the GUI is performed by a sampling agent configured to:
    read a display buffer containing a representation of the GUI by accessing one or more application programming interfaces (APIs) of a guest operating system (GOS) on a virtual machine (VM) executing on the server device; and
    compare a color value of a pixel in the first portion of the GUI of a current frame in the display buffer with the color value of said pixel of a previous frame in the display buffer to detect changed pixel color values, wherein the changed pixel values indicate the one or more display updates to the GUI.

2. The method of claim 1, further comprising:
identifying the second portion of the GUI based on a location of a user input event, wherein the user input event includes at least one of: a mouse move, a mouse click, or a keyboard input;
wherein the second frequency is higher than the first frequency.

3. The method of claim 1, further comprising:
identifying the second portion of the GUI based on historical changes that occurred within the second portion of the GUI.

4. The method of claim 1, wherein the first portion of the GUI is a general region of the GUI and wherein the second portion of the GUI is a local region that is a subset of the general region.

5. The method of claim 1, further comprising:
identifying a third portion of the GUI; and
polling the third portion of the GUI at a third frequency that is different from the first frequency and from the second frequency.

6. The method of claim 1, further comprising:
generating a sampling map that identifies pixels contained in the second portion of the GUI, wherein the sampling map is used to perform the polling of the second portion of the GUI.

7. The method of claim 1, further comprising:
detecting the one or more display updates to the GUI based on polling the first portion and polling the second portion; and
transmitting the one or more display updates to the client device over the network connection.

8. A server computing device, comprising:
at least one processor; and
memory including instructions that, when executed by the at least one processor, cause the server computing device to perform the operations of:
generating a graphical user interface (GUI) for remoting to a client device over a network connection;
polling a first portion of the GUI at a first frequency to detect one or more display updates to the GUI that are to be transmitted to the client device; and
polling a second portion of the GUI at a second frequency to detect the one or more display updates to the GUI that are to be transmitted to the client device, wherein the second frequency is different from the first frequency;
wherein polling the first portion of the GUI and polling the second portion of the GUI is performed by a sampling agent configured to:
read a display buffer containing a representation of the GUI by accessing one or more application programming interfaces (APIs) of a guest operating system (GOS) on a virtual machine (VM) executing on the server computing device; and
compare a color value of a pixel in the first portion of the GUI of a current frame in the display buffer with the color value of said pixel of a previous frame in the display buffer to detect changed pixel color values, wherein the changed pixel values indicate the one or more display updates to the GUI.

9. The server computing device of claim 8, wherein the memory further comprises instructions executed by the at least one processor to cause the server computing device to perform the operations of:
identifying the second portion of the GUI based on a location of a user input event, wherein the user input event includes at least one of: a mouse move, a mouse click, or a keyboard input;
wherein the second frequency is higher than the first frequency.

10. The server computing device of claim 8, wherein the memory further comprises instructions executed by the at least one processor to cause the server computing device to perform the operations of:
identifying the second portion of the GUI based on historical changes that occurred within the second portion of the GUI.

11. The server computing device of claim 8, wherein the first portion of the GUI is a general region of the GUI and wherein the second portion of the GUI is a local region that is a subset of the general region.

12. The server computing device of claim 8, wherein the memory further comprises instructions executed by the at least one processor to cause the server computing device to perform the operations of:
identifying a third portion of the GUI; and
polling the third portion of the GUI at a third frequency that is different from the first frequency and from the second frequency.

13. A non-transitory computer readable storage medium comprising one or more sequences of instructions, the instructions when executed by one or more processors causing the one or more processors to execute the operations of:
generating, by a server device, a graphical user interface (GUI) for remoting to a client device over a network connection;
polling, at the server device, a first portion of the GUI at a first frequency to detect one or more display updates to the GUI that are to be transmitted to the client device; and
polling, at the server device, a second portion of the GUI at a second frequency to detect the one or more display updates to the GUI that are to be transmitted to the client device, wherein the second frequency is different from the first frequency; wherein polling the first portion of the GUI and polling the second portion of the GUI is performed by a sampling agent configured to:
read a display buffer containing a representation of the GUI by accessing one or more application programming interfaces (APIs) of a guest operating system (GOS) on a virtual machine (VM) executing on the server device; and
compare a color value of a pixel in the first portion of the GUI of a current frame in the display buffer with the color value of said pixel of a previous frame in the display buffer to detect changed pixel color values, wherein the changed pixel values indicate the one or more display updates to the GUI.

14. The non-transitory computer readable storage medium of claim 13, further comprising instructions executed by one or more processors and causing the one or more processors to execute the operations of:
identifying the second portion of the GUI based on a location of a user input event, wherein the user input event includes at least one of: a mouse move, a mouse click, or a keyboard input;

wherein the second frequency is higher than the first frequency.

15. The non-transitory computer readable storage medium of claim 13, further comprising instructions executed by one or more processors and causing the one or more processors to execute the operations of:
identifying the second portion of the GUI based on historical changes that occurred within the second portion of the GUI.

16. The non-transitory computer readable storage medium of claim 13, wherein the first portion of the GUI is a general region of the GUI and wherein the second portion of the GUI is a local region that is a subset of the general region.

17. The non-transitory computer readable storage medium of claim 13, further comprising instructions executed by one or more processors and causing the one or more processors to execute the operations of:
detecting the one or more display updates to the GUI based on polling the first portion and polling the second portion; and
transmitting the one or more display updates to the client device over the network connection.

* * * * *